United States Patent [19]
Lunzer et al.

[11] 3,964,561
[45] June 22, 1976

[54] SNOWMOBILE SKI WEAR ROD

[75] Inventors: Leo M. Lunzer; Allan Evgen, both of Forest Lake, Minn.

[73] Assignee: Allee Manufacturing, Inc., Forest Lake, Minn.

[22] Filed: Sept. 11, 1974

[21] Appl. No.: 504,975

Related U.S. Application Data

[63] Continuation of Ser. No. 241,345, April 5, 1972, abandoned.

[52] U.S. Cl. ................................. 180/5 R; 280/28
[51] Int. Cl.² ...................................... B62M 27/02
[58] Field of Search ............ 280/28, 11.18; 180/5 R

[56] References Cited
UNITED STATES PATENTS

| | | | |
|---|---|---|---|
| 1,826,958 | 10/1931 | Sayer | 280/11.18 |
| 3,545,560 | 12/1970 | Fox | 280/28 |

Primary Examiner—Robert R. Song
Attorney, Agent, or Firm—Orrin M. Haugen

[57] ABSTRACT

In combination with a motorized snow vehicle having frame means, drive track means for propelling the vehicle, and controllable turning ski means for controllably turning the vehicle, an elongated rod secured along the bottom of the ski means with the axis thereof extending generally parallel to the longitudinal axis. The shank portion of the rod has a generally radially extending slot formed therein to provide an axially arranged slot disposed along the base running surface of the rod and extending along the length of the shank portion. The rod is further provided with means for securing the rod to the underside of the ski. The rods are preferably formed of hardened steel so as to enhance the wear characteristics of the rod.

3 Claims, 6 Drawing Figures

SNOWMOBILE SKI WEAR ROD

This is a continuation of application Ser. No. 241,345 filed Apr. 5, 1972, now abandoned.

BACKGROUND OF THE INVENTION

The present invention relates generally to an improved wear rod which is arranged to be secured along the bottom of the ski means of a conventional motorized snow vehicle, and more particularly to such a rod which is provided with a slot along the length thereof to enhance the steering characteristics of the rod.

Motorized snow vehicles in common use today normally employ frame means, a drive track for propelling the vehicle, and a controllable turning ski in the form of a pair of longitudinally parallelly disposed skis. For those running conditions which are normally encountered, the conventional ski means has been found to lack the ability to turn sharply, or in response to the turning of the ski, particularly at high speeds. Therefore, for racing purposes, it is frequently desirable to supplement the running surface of the ski with some means to enhance the control of the ski and the ultimate turning capability of the vehicle under running conditions.

SUMMARY OF THE INVENTION

The present invention is concerned with an improved means for enhancing the turning capability of a snow vehicle, these means including elongated rods secured along the bottom of the ski means of the snow vehicle, and with the axis of the rods extending generally parallel to the longitudinal axis of the ski. The rod is provided with a groove along the under-surface thereof, that is, the surface in contact with the surface of the snow. These rod elements are preferably fabricated from hardened steel in order to improve the durability and wearability. If desired, the grooved areas may be provided with hardened wear surfaces which extend beyond the normal points of contact of the groove edges, thereby further enhancing the durability and wearability as well as control of the vehicle.

The rod members of the present invention are arranged to be secured fast to the underside of the ski, and the units are normally provided with means for maintaining axial alignment between the rod and the ski. For obtaining the control of the vehicle during turning or the like, the edges of the groove, as well as the radially extending surfaces thereof provide the added control necessary to enhance the stability and turnability of the snow vehicle. This turnability and controllability has been found to be substantially enhanced under adverse operating conditions, particularly when operating at high speeds during racing or the like.

Therefore, it is a primary object of the present invention to provide an improved elongated rod element arranged to be secured to the bottom of the control or turning ski means of a snow vehicle, with these rods being provided with a radially extending slot which is disposed in running contact with the snow surface.

It is a further object of the present invention to provide an improved means for enhancing the controllability and turnability of a snow vehicle having controllable turning ski means disposed at the front thereof, the control feature being obtained by an elongated rod element which is arranged to be secured to the undersurface of the ski means, the rod being provided with an axially arranged slot which is disposed along the base running surface thereof and extends generally along the shank portion of the rod.

It is yet a further object of the present invention to provide an improved means for improving the controllability and turnability of a conventional motorized snow vehicle, the enhanced control being obtained by mounting an elongated rod along the running surface of the controllable turning ski means of the snow vehicle, the rod means having a groove extending generally along the base thereof, and with the rod being hardened so as to improve the wearing characteristics thereof.

Other and further objects of the present invention will become apparent to those skilled in the art upon a study of the following specification, appended claims, and accompanying drawing.

DESCRIPTION OF THE PREFERRED EMBODIMENT

Figure 1:
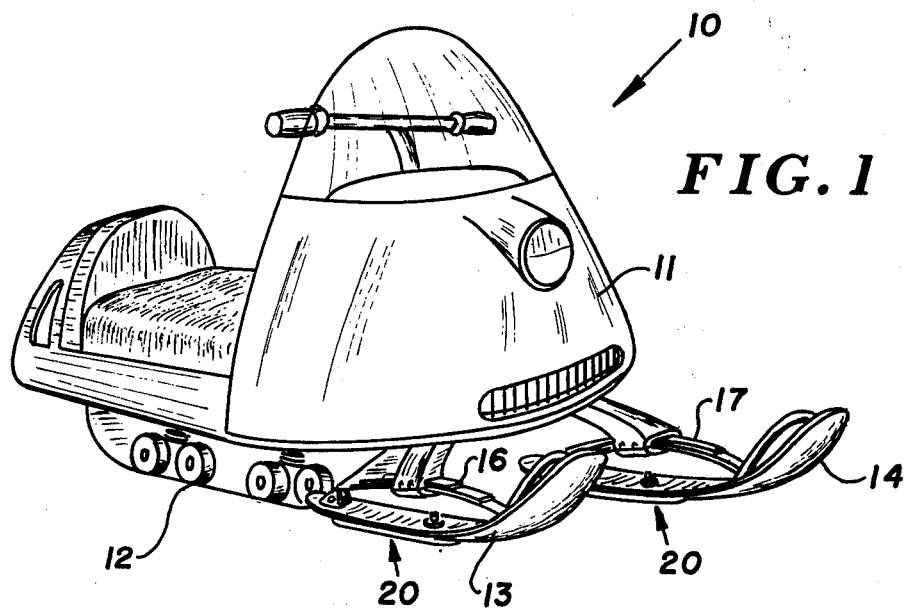
FIG. 1 is a perspective view of a motorized snow vehicle with the running surface on the bottom of the ski being provided with the improved control rods of the present invention.

In accordance with the present invention, the conventional motorized snow vehicle generally designated 10 is provided with a frame or chassis means 11 along with a drive track means 12 arranged and adapted for propelling the vehicle. A pair of controllable turning skis are shown at the forward end of the vehicle at 13 and 14, these skis being utilized for controllably turning the vehicle during operation. The underside of the skis 13 and 14 provide a running surface which makes contact with the snow over which the vehicle is being propelled.

The individual skis 13 and 14 are coupled to the frame 11 by means of the spring elements 16 and 17, which are, in turn, coupled as at 18 to the spindle of the turning mechanism. It will be appreciated that the description of the vehicle above is conventional and is intended to represent the conventional motorized snow vehicles which are in wide use today and, of course, commercially available.

Figure 2:
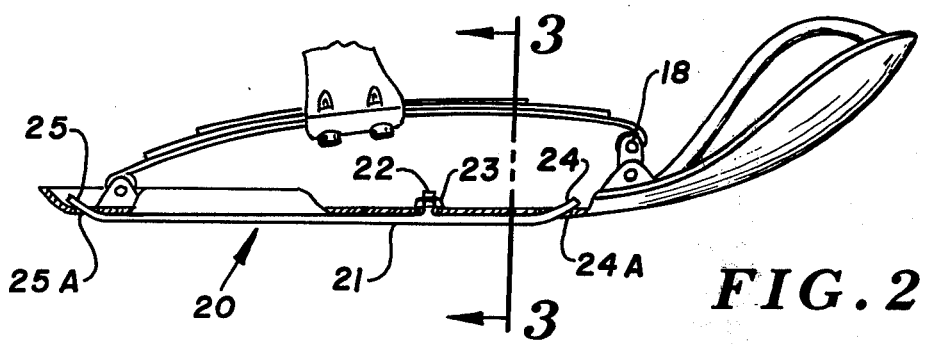
FIG. 2 is a detail elevational view of the turning ski utilized on a conventional motorized snow vehicle, with the ski being shown partially in section, and further showing the improved control rod of the present invention coupled to the running surface thereof.
Figure 3:
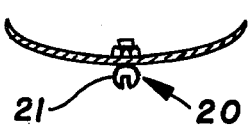
FIG. 3 is a vertical sectional view taken along the line and in the direction of the arrows 3—3 of FIG. 2.

With continued attention being directed to FIGS. 1 and 2 of the drawing, it will be observed that the running surfaces on the bottom of the skis are provided with an elongated rod element, such as the rods generally designated 20—20, these rods being securely fastened to the ski surface. For mounting purposes, a hole is formed in the ski element, and arranged to receive stud 22 which is, in turn, coupled to the shank portion 21 of rod 20. Nut 23 is used to clampingly hold the rod 20 onto the ski. The tips of the rod, as shown at 24 and 25, are received in the slot areas 24A and 25A, respectively, which are formed in the body of the skis 13 and 14. These slots 24A and 25A are arranged to maintain axial alignment between the rod and the ski means.

Figure 4:
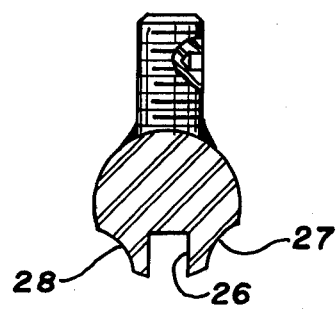
FIG. 4 is a vertical sectional view taken through the forward portion of the shank of a control rod prepared in accordance with the present invention.

The shank portion 21 of the rod 20 is provided with a groove 26, this groove extending radially outwardly from the center portion of the rod and providing an axially arranged slot which is disposed along the running surface of the rod, and extending generally along the length of the shank portion of the rod. This slot provides an additional area for making contact between the rod and the snow surface, thereby enhancing the ability of the rod to aid in turning, and avoid skidding motion of the skis. While the slot 26 is normally adequate for enhancing the control of the vehicle, it has been found that improved performance can be obtained by sharpening the points of contact arranged laterally of the slot, such as in the manner shown in FIG. 4. In this fashion, additional arcuate grooves are formed as at 27 and 28 to provide a pointed contact between the snow and the rod 20.

Figure 5:
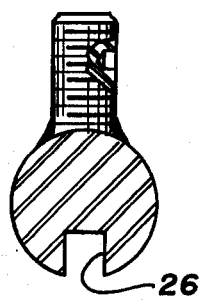
FIG. 5 is a view similar to FIG. 4, and illustrating a modified form of control rod.
Figure 6:
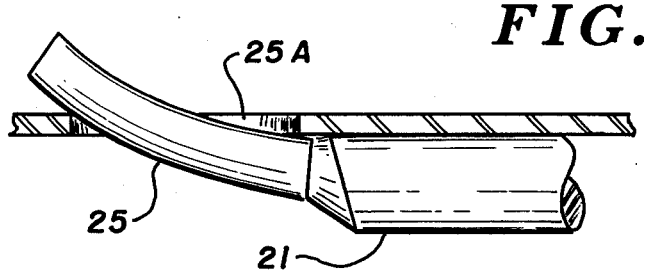
FIG. 6 is a detail view, on an enlarged scale, showing the manner in which the tip ends of the control rod are received within slots formed in the ski, with the ski being shown in vertical section, and with the control rod being partially broken away.

For materials of construction, it has been found that the units are preferably obtained from hardened steel, thereby enhancing the wear characteristics of the devices. Aus-tempered steel has been found to be particularly desirable for this application. It will be further appreciated that metal carbides may be employed, such as tungsten carbide or the like to form the running surface. Such carbides may, or course, be formed as inserts to be received within the grooves 26 shown in FIGS. 4 and 5. For most purposes, a hardness of about 45 Rockwell has been found to be more useful, and is preferred.

While the drawing has indicated that the rod structure is generally round in cross-section, it will be appreciated that other normal regular configurations may be employed successfully, such as, for example, hexagonal stock or the like. Thus, the term "rod" is used in a comprehensive sense so as to cover regular multi-sided closed patterns or configurations.

We claim:

1. In combination with a motorized snow vehicle having frame means, drive track means for propelling said vehicle, and controllable turning ski means for guiding said vehicle and having a longitudinal ski axis and a running surface on the bottom thereof; an elongated rod secured along the bottom of said ski means and with the axis thereof extending generally parallel to the longitudinal axis of the ski, said elongated rod means comprising:
   a. a rod having a closed generally circular cross-section and with a forward tip end, a rear tip end, and a shank portion extending therebetween and providing a generally convex running surface;
   b. said shank portion having a generally inwardly directed radially extending groove formed therein to provide an axially arranged slot with parallely disposed laterally extending edge surfaces formed along the convex running surface thereof and extending along the length thereof; and
   c. mounting means arranged along the shank portion for securing said rod to the underside of said ski means, and means for maintaining axial alignment between said elongated rod and said ski means.

2. The combination as defined in claim 1 being particularly characterized in that said elongated rod is formed with sharpened areas adjacent the groove formed therein.

3. The combination as defined in claim 1 being particularly characterized in that solts are formed in said ski means and the forward and rearward rod tip portions are bent arcuately upwardly from the longitudinal axis of said shank portion and arranged to extend through said slots for maintaining axial alignment between said elongated rod and said ski means.

* * * * *